United States Patent
Arcuri et al.

(10) Patent No.: US 7,467,183 B2
(45) Date of Patent: Dec. 16, 2008

(54) METHOD, APPARATUS, AND USER INTERFACE FOR MANAGING ELECTRONIC MAIL AND ALERT MESSAGES

(75) Inventors: Michael Philip Arcuri, Seattle, WA (US); Radu Bacioiu, Kirkland, WA (US); Christopher Cameron White, Seattle, WA (US); Paul Daley, Redmond, WA (US); Chaitanya Dev Sareen, Seattle, WA (US); Anthony Joseph Beeman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 860 days.

(21) Appl. No.: 10/367,271

(22) Filed: Feb. 14, 2003

(65) Prior Publication Data

US 2004/0162879 A1    Aug. 19, 2004

(51) Int. Cl.
*G06F 15/16* (2006.01)
*G06F 15/173* (2006.01)
*G06F 3/00* (2006.01)
*G06F 17/30* (2006.01)
*H04J 1/00* (2006.01)
*G06G 1/14* (2006.01)

(52) U.S. Cl. .......... 709/203; 709/238; 709/206; 709/207; 709/224; 709/225; 709/229; 709/232; 715/700; 715/713; 370/485; 705/10; 705/22

(58) Field of Classification Search .......... 709/203, 709/224, 206, 225, 245, 207, 229, 232, 238, 709/204, 205; 705/10, 22; 370/485; 715/700, 715/713
See application file for complete search history.

(56) References Cited

U.S. PATENT DOCUMENTS 5,813,007 A * 9/1998 Nielsen .......... 707/10

(Continued)

FOREIGN PATENT DOCUMENTS

WO       WO 01/53965 A1     7/2001

(Continued)

OTHER PUBLICATIONS

"E-Mail Alert," *Wall Street & Technology*, CMP Media, Inc., vol. 20, No. 8, Aug. 2002, p. 14-18.

(Continued)

*Primary Examiner*—John Follansbee
*Assistant Examiner*—Karen C Tang
(74) *Attorney, Agent, or Firm*—Merchant & Gould

(57) ABSTRACT

A method, apparatus, system, and user interface are provided for managing e-mail rules and alert subscriptions from multiple sources. Alert messages and persistent state objects, such as cookies, are examined to determine whether they relate to an alert subscription. If an e-mail message or persistent state object is determined to relate to an alert subscription, a network address for a subscription source identified by the contents of the e-mail message or state object are added to a list of subscription sources. A request may then be received to manage one or more alert subscriptions. In response to the request, each subscription source identified in the list of subscription sources is validated. Each validated subscription source is added to a current subscriptions list, which is displayed to a user. Each subscription in the current subscriptions list may be modified or deleted by the user through a unified user interface for managing e-mail rules and alert subscriptions. Schema and data structures are also provided for communication between an e-mail and alert subscription client and a subscription source.

6 Claims, 12 Drawing Sheets

U.S. PATENT DOCUMENTS

| | | | | |
|---|---|---|---|---|
| 5,930,479 | A * | 7/1999 | Hall | 709/238 |
| 5,931,905 | A * | 8/1999 | Hashimoto et al. | 709/217 |
| 5,944,787 | A * | 8/1999 | Zoken | 709/206 |
| 6,018,619 | A | 1/2000 | Allard et al. | 395/200.54 |
| 6,052,709 | A * | 4/2000 | Paul | 709/202 |
| 6,073,142 | A * | 6/2000 | Geiger et al. | 715/205 |
| 6,101,531 | A * | 8/2000 | Eggleston et al. | 709/206 |
| 6,195,698 | B1 * | 2/2001 | Lillibridge et al. | 709/225 |
| 6,421,709 | B1 | 7/2002 | McCormick et al. | 709/206 |
| 6,496,928 | B1 | 12/2002 | Deo et al. | 713/153 |
| 6,633,910 | B1 * | 10/2003 | Rajan et al. | 709/224 |
| 6,868,498 | B1 * | 3/2005 | Katsikas | 726/14 |
| 7,069,233 | B2 * | 6/2006 | Bracken et al. | 705/10 |
| 7,133,898 | B1 * | 11/2006 | Malik | 709/206 |
| 7,249,175 | B1 * | 7/2007 | Donaldson | 709/225 |
| 2002/0165916 | A1 * | 11/2002 | Kitamura | 709/203 |
| 2003/0216969 | A1 * | 11/2003 | Bauer et al. | 705/22 |
| 2004/0133646 | A1 * | 7/2004 | Leukert-Knapp et al. | 709/206 |
| 2004/0162879 | A1 * | 8/2004 | Arcuri et al. | 709/206 |
| 2005/0030977 | A1 * | 2/2005 | Casey et al. | 370/485 |

FOREIGN PATENT DOCUMENTS

WO      WO 01/89174 A2     11/2001

OTHER PUBLICATIONS

P. Konshak, "Coding A Custom E-Mail Alert Service for New Books," *Computers in Libraries*, Carmel Clay Public Library, vol. 21, No. 2, Feb. 2001, p. 24-28.

V. Maricic, B. Zalar, D. Filjar, M. Zic, M. Opsenica, D. Frank, "EMA System: Another Application For Future Telecom World," ConTEL 99, 5th International Conference On Telecommunications and 2nd Broadband and Multimedia Workshop Proceedings, Jun. 1999, p. 379-384.

Y.-M. Wang, P. Bahl, W. Russell, W., "The SIMBA User Alert Service Architecture For Dependable Alert Delivery," Proceedings International Conference On Dependable Systems and Networks, Jul. 2001, p. 463-472.

R. Safian, "Damming Spam-E-Mail Management," *EDUCOM Review*, Northwestern University, Jan./Feb. 1999, vol. 34, No. 1, p. 24-27.

Chang-Jiun Tsai, Shian-Shyong Tseng, Her-Tsaan Cheng, "Intelligent E-Mail Management System," Dept. of Computer & Information Sciece, Nat. Chiao Tung IEEE SMC'99 Conference Proceedings, 1999 IEEE International Conference On Systems, Mann, and Cybernetics, Oct. 1999, vol. 5, p. 824-829.

Russian Official Action dated Aug. 4, 2008 cited in Application No. 2004104197/09(004535).

* cited by examiner

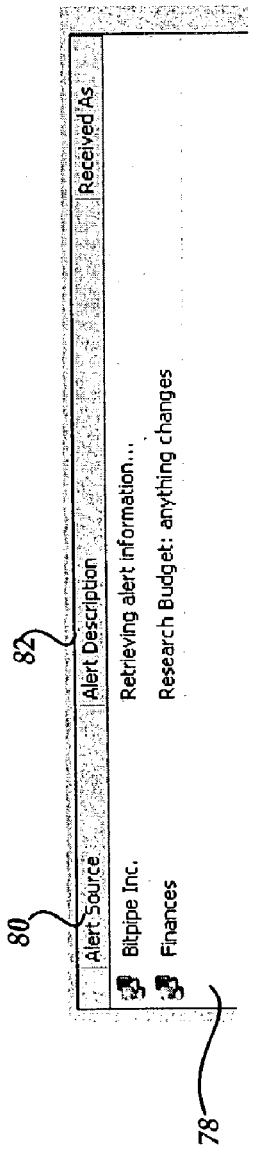
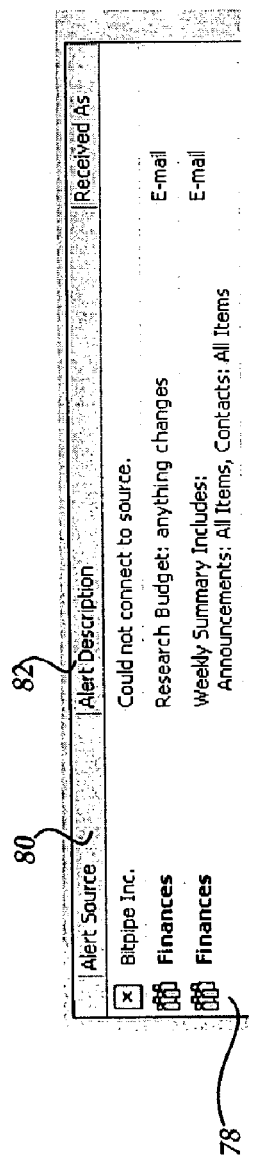
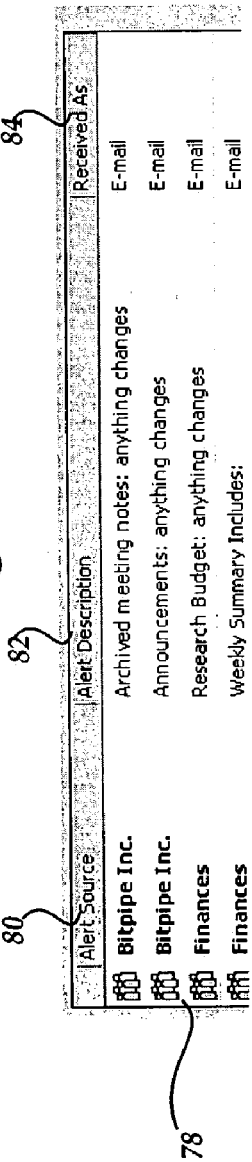
Fig.5A.
Fig.5B.
Fig.5C.

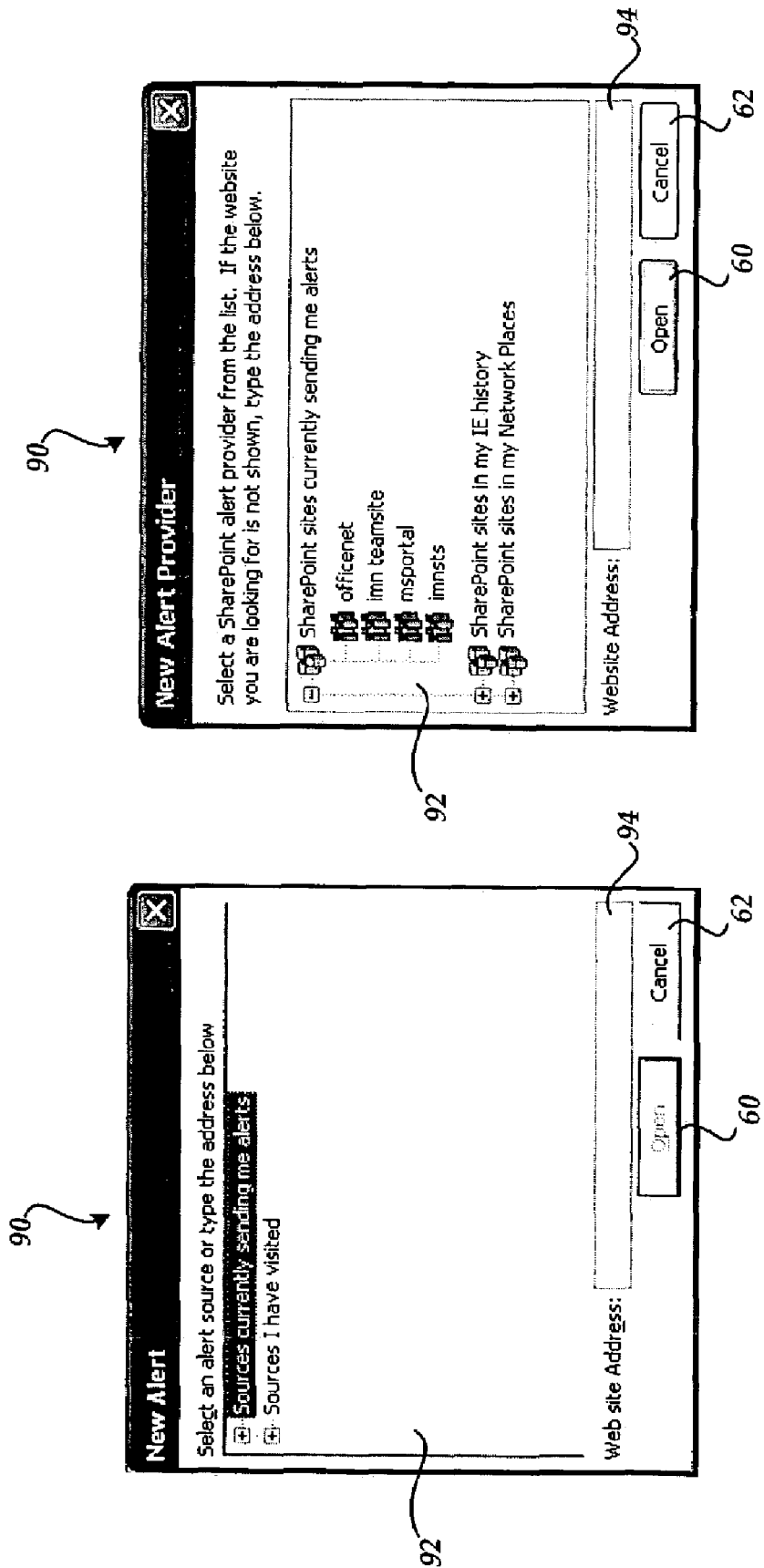

Team Web Site
New Alert

Use this page to create a new alert. Alerts are a great way to keep updated about changes to your teamsite.

Choose a List or Document Library

Select a List or Document Library that you want to keep track of. You may also view the contents of a group and then track one of the individual items. After creating an alert, you'll receive e-mail notifying you of changes.

- ⦿ Shared Documents
  Share a document with the team by adding to document library.
- ○ Web Part Catalog
  Use this Web Part Catalog to store and
- ○ Web Templates
  Make a template available for use in adding it to this catalog.
- ○ Announcements
  Use the Announcements list to post me home page of your site.
- ○ Contacts
  Use the Contacts list for information ab your team works with.
- ○ Events
  Use the Events list to keep informed of meetings, deadlines, and other importa
- ○ Links
  Use the Links list for links to Web page members will find interesting or useful

[ Next ]

*Fig. 7.*

METHOD, APPARATUS, AND USER INTERFACE FOR MANAGING ELECTRONIC MAIL AND ALERT MESSAGES

TECHNICAL FIELD

The invention relates generally to the field of electronic message processing and, more specifically, to the field of management of electronic messages received from disparate sources.

BACKGROUND OF THE INVENTION

As a result of the creation and explosion of the Internet, computer users now have more information at their fingertips and are better able to communicate with one another than ever before. For instance, computer users at home or in the workplace can send each other electronic mail ("e-mail") messages. Similarly, computer users can also sign up for subscriptions to e-mail list servers (called "listservs"). Through a listserv, computer users can send and receive e-mail messages to and from an entire list of users, usually on a common topic, by sending a single message to a predefined address. A listserv can therefore make it easier for a user to receive e-mail messages from a large number of users on a particular topic.

In a similar vein, electronic teamwork tools have been developed that allow workers to easily collaborate and share information. In one example of these types of tools, a facility is provided for easily creating a team intranet or World Wide Web ("Web") site. Through the Web site, authorized users can collaborate on projects, exchange files and other messages, and generally stay current on matters related to the work of the team. In order to receive updates regarding changes to the Web site, participating users may sign up for alert subscriptions. Through an alert subscription, a user may be notified via e-mail when the team calendar changes, when a document is modified, or when other types of events occur.

Users may also receive alert notifications through instant messaging ("IM") applications. Through an IM application, a user may be notified when a newsworthy event occurs, when a sporting event has completed, when a package is delivered, or when other types of events occur. These alert subscriptions made be made and maintained through a Web site provided by the IM provider. Similarly, Web sites exist that allow a user to sign up for e-mail alert subscriptions. Through an e-mail alert subscription, an e-mail may be transmitted to a user when an identified event occurs. Alternatively, a user may request that an e-mail be transmitted at the close of the stock market each day or with the day's weather each morning.

Many computer users receive messages from all of the disparate sources discussed above. So, for instance, a user may receive traditional e-mail, alert e-mail generated by a subscription at a teamwork or collaboration Web site, e-mail messages generated by a listserv, alert messages generated through a subscription with an IM provider, normal instant messaging alerts, and alert e-mail messages sent as a result of a subscriptions at a Web site. While the large amount of information received from each of these sources provides the user with a great deal of important data, receiving information in this manner is not without its drawbacks.

One of the main drawbacks to receiving a large number of alert e-mail or other type of messages from multiple sources is the difficulty in managing the subscriptions. In particular, because Web sites are often used to provide subscription management facilities, a user must remember the Web address of the subscription site. The user may not remember the address of the subscription site if the user subscribes to many alerts or if a long period of time elapses between the time the user first subscribes and a later time when the user wants to modify the subscription. In this case, the user will have to search for the appropriate site to modify or delete their subscription. Moreover, since many alert subscriptions are generated and maintained at different sources, the user may have to visit many different Web sites to view, modify, or delete each of the individual alert subscriptions.

It is with respect to these considerations and others that the present invention has been made.

SUMMARY OF THE INVENTION

In accordance with the present invention, the above and other problems are solved by a method, system, and apparatus for managing e-mail messages and alert subscriptions that allow a user to more easily manage disparate sources of alert subscriptions and that allow rich control of rules that are applied to e-mail messages. Aspects of the invention allow a user to more easily manage e-mail rules and alert subscriptions provided by many different sources.

In accordance with other aspects, the present invention relates to a method for management of e-mail and alert messages. Alert messages are messages received as e-mail or another type of message in response to an alert subscription with an alert subscription source. According to the method, received e-mail messages are examined to determine whether they relate to an alert subscription. If an e-mail message is determined to relate to an alert subscription, a network address, such as a Uniform Resource Locator ("URL"), for a subscription source identified by the contents of the e-mail message are added to a list of subscription sources once they are verified. Data indicating that the e-mail message is related to an alert and the network address of the subscription source may be encoded within a header portion of the e-mail message so that the data is not normally displayed by an e-mail client application program.

According to other aspects of the methods provided herein, the contents of persistent state objects, such as a cookie generated by a Web browser, may be examined to determine whether they relate to an alert subscription. If the contents of a persistent state object are determined to relate to an alert subscription, a network address for a subscription source identified by the contents of the persistent state object are added to the list of subscription sources.

According to additional aspects of the methods provided herein, a request may be received to manage one or more alert subscriptions. In response to the request, each subscription source identified in the list of subscription sources is validated. Validation may be accomplished by performing a request and response exchange with each subscription source. If the response is correct, the subscription source will be validated. If the response received from the subscription source is not correct, the subscription source is invalid. Each validated subscription source is added to a current subscriptions list, which is displayed to a user. Each subscription in the current subscriptions list may be modified or deleted by the user. Additionally, the user may add additional alert subscriptions from the sources identified in the current subscriptions list, from a subscriptions provider previously visited by the user in a Web browser, or from a subscriptions provider for which the user manually provides a network address.

In accordance with still other aspects of the invention, the present invention relates to a unified user interface for managing e-mail rules and alert subscriptions. Through the user interface, a user can easily add or modify e-mail rules and alert subscriptions from any number of disparate sources. The user interface includes a user interface window having a first portion for receiving user interface commands relating to the handling of e-mail messages through the use of e-mail rules. The user interface allows a user to create new rules that are applied to e-mail messages, modify rules, change the ordering of rules, and perform other functions. The user interface window also includes a second portion for receiving user interface commands relating to the management of alert subscriptions. Through the second user interface portion, a user can create new alert subscriptions, view properties of existing alert subscriptions, delete existing subscriptions, and define rules that should be applied to incoming alert messages. The unified interface eliminates the laborious process of managing alert subscriptions through many disparate Web and e-mail interfaces.

Other aspects of the invention relate to schema and data structures utilized for communication between an e-mail and alert subscription client and a subscription source. The invention may also be implemented as a computer process, a computing system, or as an article of manufacture such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIGS. 3-6B show aspects of a unified user interface for managing e-mail rules and alert subscriptions provided in one embodiment of the invention;

FIG. 7 illustrates a user interface for creating a new alert subscription generated by an subscription source computer in one embodiment of the invention;

DETAILED DESCRIPTION OF THE INVENTION

Figure 1:
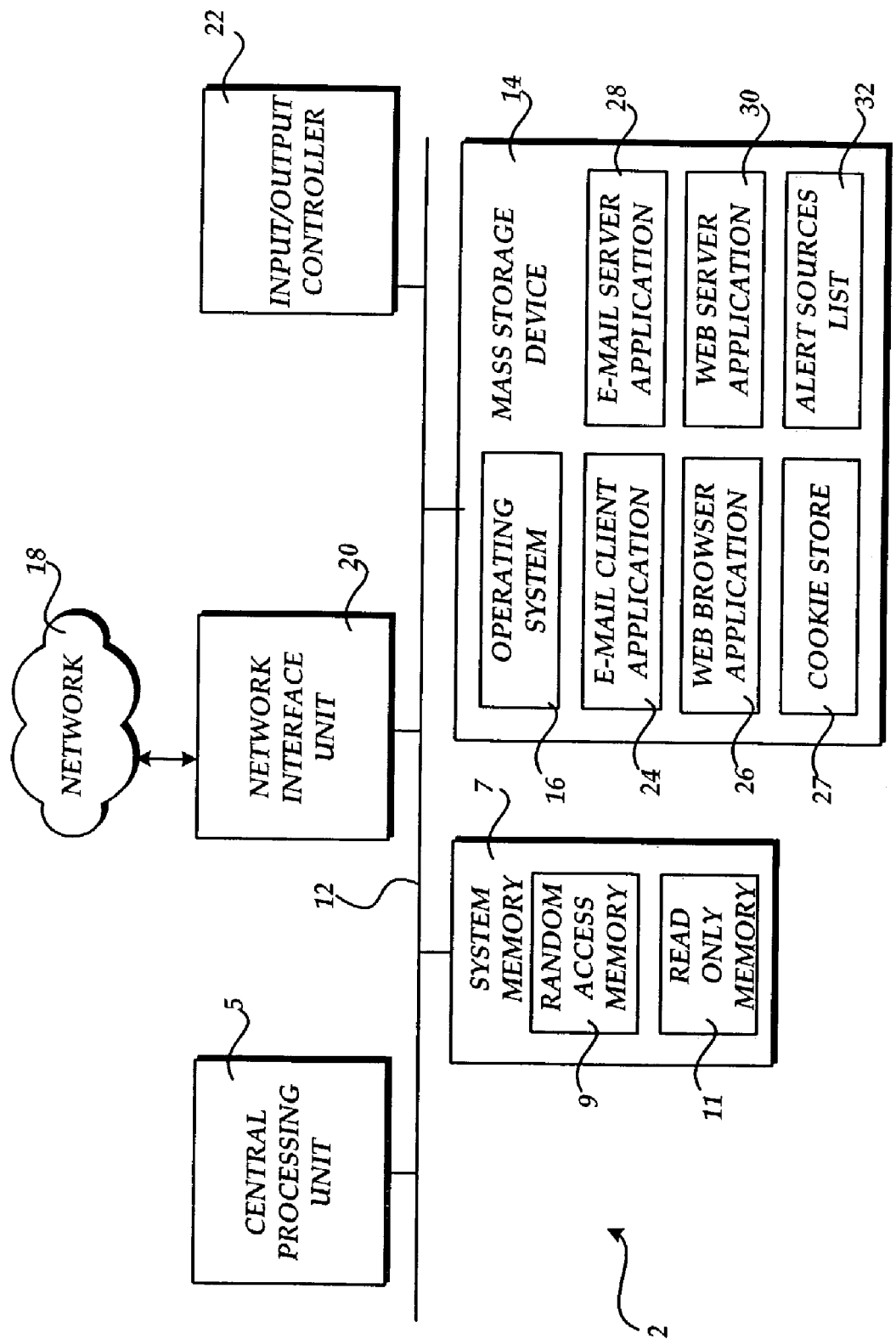
FIG. 1 illustrates a computer architecture utilized by a subscription source and a subscription client computer provided in one embodiment of the invention.

Referring now to the drawings, in which like numerals represent like elements, a computer hardware and software architecture utilized by several computers provided in the various embodiments of the invention will be described. In particular, FIGS. 1 and 2 and the corresponding discussion are intended to provide a brief, general description of a suitable computing environment in which embodiments of the invention may be implemented. While the invention will be described in the general context of program modules that execute in conjunction with program modules that run on an operating system on a personal or server computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computing system 2 utilized in the various embodiments of the invention will be described. The computer architecture shown in FIG. 1 illustrates a conventional desktop or server computer, including a central processing unit 5 ("CPU"), a system memory 7, including a random access memory 91 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computing system 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media, provide non-volatile storage for the computing system 2. Although the description of computer-readable media contained herein refers to a mass storage device, such as a hard disk or CD-ROM drive, it should be appreciated by those skilled in the art that computer-readable media can be any available media that can be accessed by the computing system 2.

By way of example, and not limitation, computer-readable media may comprise computer storage media and communication media. Computer storage media includes volatile and non-volatile, removable and non-removable media implemented in any method or technology for storage of information. Computer storage media includes, but is not limited to, RAM, ROM, EPROM, LEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing system 2.

According to various embodiments of the invention, the computing system 2 may operate in a networked environment using logical connections to remote computers through a network 18, such as the Internet. The computing system 2 may connect to the network 18 through a network interface unit 20 connected to the bus 12. It should be appreciated that the network interface unit 20 may also be utilized to connect to other types of networks and remote computer systems. The computing system 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the client computer 2, including an operating system 16 suitable for controlling the operation of a networked personal or server computer, such as the WINDOWS XP operating system from MICROSOFT CORPORATION of Redmond, Wash. The mass storage device 14 and RAM 9 may also store one or more program modules. In particular, if the computing system 2 is configured as a client computer, the mass storage device 14 and the RAM 9 may store an e-mail client application 24, a Web browser application 26, a cookie store 27, and an alert sources list 32.

As known to those skilled in the art, the e-mail client application 24 comprises an application program for retrieving and sending e-mail messages from one or more e-mail servers. The e-mail client application 24 may include additional other features, such as personal information management ("PIM") functions, including a calendar, task manager, contacts database, and the like. The e-mail client application 24 utilized in the embodiments of the invention described herein comprises the OUTLOOK PIM from MICROSOFT CORPORATION. However, it should be appreciated that the various aspects of the invention provided herein may be utilized in conjunction with any application program capable of receiving and sending electronic mail messages.

According to one embodiment of the invention, the e-mail client application 24 may store and maintain an alert sources list 32. The alert sources list 32 comprises a list of the available server computers from which alert subscriptions are active. As will be described in greater detail below, the e-mail client application 24 is operative to add alert sources to the alert sources list 32 in response to identifying information contained in an e-mail or a cookie indicating that an alert subscription has been made. Various additional aspects of the e-mail client application 24 for managing e-mail rules and alert subscriptions will be described below:

The Web browser application 26 comprises an application program capable of requesting and rendering Web pages created in the hyper-text markup language ("HTML") or other types of markup languages. An example of one such Web browser is the INTERNET EXPLORER Web browser from MICROSOFT CORPORATION or the NETSCAPE NAVIGATOR Web browser from NETSCAPE CORPORATION. It should be appreciated that a typical Web browser application 26 may receive a request to store a persistent state object at the computing system 2. A persistent state object allows a Web server to maintain the state of communications with the computing system 2. A "cookie" is one type of persistent state object and may be stored by the Web browser application 26 in the cookie store 27. The cookie store 27 may comprise a directory in the file structure maintained by the computing system 2 or other type of database for storing persistent state objects.

As described briefly above, the computing system 2 shown in FIG. 1 may also be configured as a server computer. If the computing system 2 is configured as a server computer, the mass storage device 14 and RAM 19 may be operative to store an e-mail server application 28 and a Web server application 30. As known to those skilled in the art, the e-mail server application 28 comprises an application program for coordinating the sending and receiving of e-mail messages. The e-mail server application 28 offers electronic mail reception and forwarding servers. Through the e-mail server application 28, authorized users may send and receive e-mail messages originating on an Intranet or the Internet. As also known to those skilled in the art, a Web server application 30 is operative to receive and respond to hyper-text transport protocol ("HTTP") requests for files stored at or available to the computing system 2. The files may then be rendered by the requesting computing system in a Web browser application 26. One example of a Web server application 30 is INTERNET INFORMATION SERVICES from MICROSOFT CORPORATION. It should be appreciated, however, that the embodiments of the invention described herein may be utilized with Web server applications from other vendors.

Figure 2:
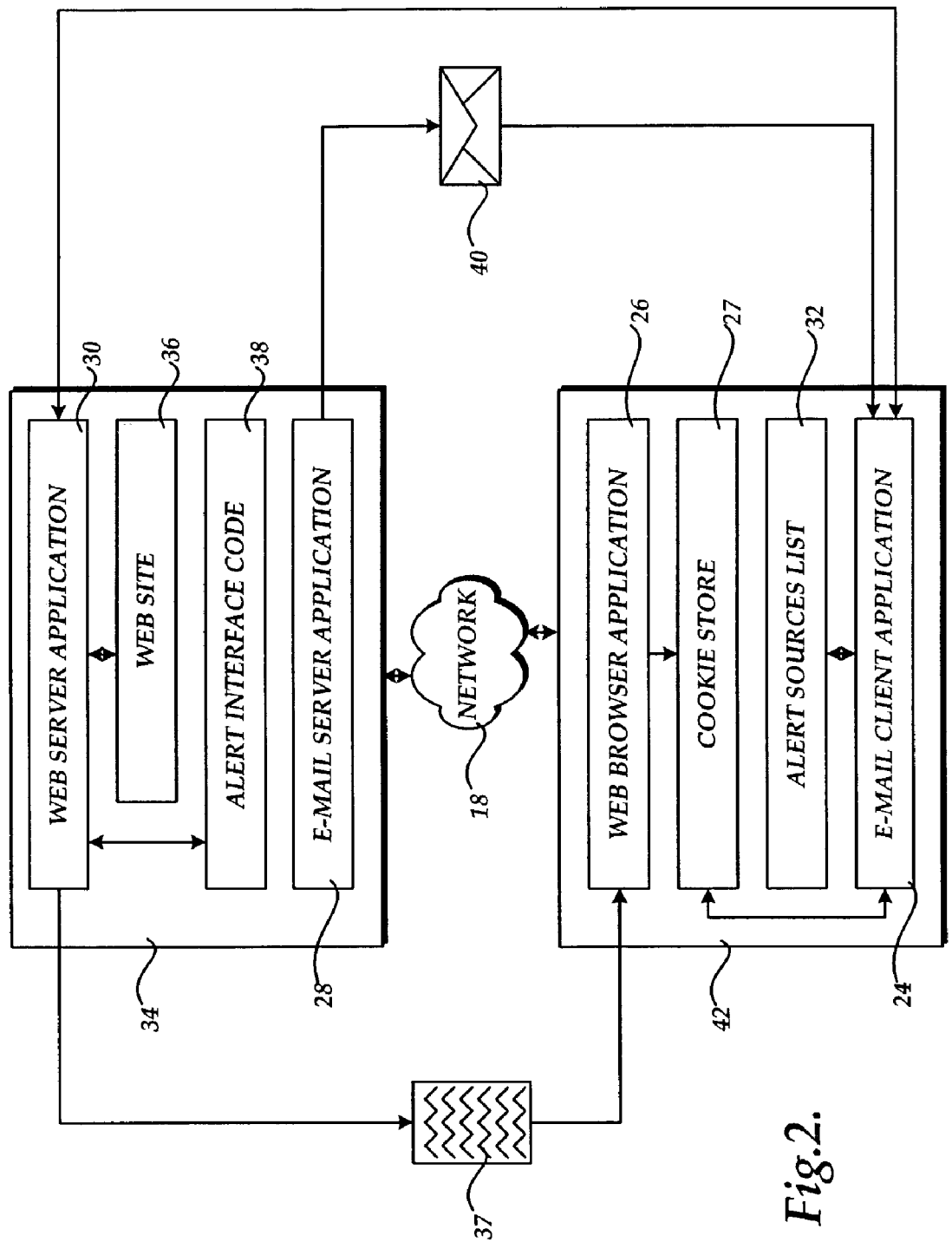
FIG. 2 shows a system for managing e-mail and alert messages provided by one embodiment of the invention.

Turning now to FIG. 2, additional aspects of the various embodiments of the invention will be described. As shown in FIG. 2, a subscription client computer 42 ("subscription client") is provided. The subscription client 42 comprises a standard personal computer as described above with respect to FIG. 1 and is operative to execute a Web browser application 26 and an e-mail client application 24. The Web browser application 26 is operative to store cookies in the cookie store 27 in response to requests from a Web server application 30. Moreover, as will be discussed in greater detail below, the e-mail client application 24 is operative to maintain an alert sources list 32 identifying each of the sources from which alert messages are received.

The subscription client 42 is connected to the subscription source computer 34 ("subscription source") through a network 18, such as an intranet or the Internet. The subscription source 34 comprises a standard server computer as described above with respect to FIG. 1. In particular, the subscription source 34 is operative to execute a Web server application 30 for responding to requests for one or more Web sites 36. As will be described in greater detail below, the Web site 36 may provide teamwork and collaboration features that allow users to subscribe to alert e-mail notifications that are transmitted to the user when documents are modified, when calendars maintained by the Web site 36 are modified, or when other events occur. Examples of such a Web site 36 are Web sites provided by and accessible through the SHAREPOINT TEAM SERVICES and SHAREPOINT PORTAL SERVICES products from MICROSOFT CORPORATION. It should be appreciated, however, that the embodiments of the invention described herein are suitable for use with any type of Web site or Web server that generates alert messages.

In order to facilitate the delivery of alert subscription messages, such as the e-mail message 40, the subscription source 34 is also operative to execute an e-mail server application 28. Alert e-mail messages may be generated by the Web site 36 in response to subscriptions made by a user of the subscription client 42. For instance, a user of the subscription client 42 may utilize the Web browser application 26 to view the Web site 36. In particular, at the Web site 36 the user may request that an alert notification be transmitted to them when a team calendar maintained at the Web site 36 is changed. Subsequently, if the team calendar is modified, the Web site 36 will generate an e-mail alert message through the e-mail server application 28. The e-mail client application 24 may then be utilized to receive the e-mail alert message.

According to one embodiment of the invention, the Web site 36 is also operative to generate alert e-mail messages, such as the e-mail 40, in such a manner that the messages indicate that they are related to an alert subscription. In particular, according to one embodiment of the invention, alert e-mail messages transmitted by the subscription source 34 as the result of a new subscription or an alert, include data that identify the message as being related to an alert subscription. This data may be extracted and utilized by the e-mail client application 24 to add the identity, network address, and other information for the subscription source 34 to the alert sources list 32.

In one embodiment, data is formatted and encoded in each alert e-mail message as header information, such as an x-header, that identifies a network address at which communication may be had with the subscription source 34. The network address identifies a location for accessing alert interface code 38 on the subscription source 34. The alert interface code 38 exposes an interface for determining the alert subscriptions for a user, deleting alert subscriptions, adding new alert subscriptions, and performing other functions related to the management of alert subscriptions.

In one embodiment, the alert interface code 38 comprises Web simple object access protocol ("SOAP") objects that may be accessed through the HTTP protocol and the Web server application 30. As known to those skilled in the art, SOAP is an extensible markup language ("XML")-based protocol for messaging and remote procedure calls and works on existing protocols, such as HTTP and HTTPS. As will be discussed in greater detail below, an XML schema is provided for passing parameters to the alert interface code 28 and for receiving results of queries made to the alert interface code 38. As will also be described in greater detail below, the e-mail client application 24 communicates With the alert interface code 28 to manage alert subscriptions at the subscription source 34.

According to one embodiment of the invention, alert e-mail messages generated by the subscription source 34 are also formatted with header information identifying the title of the alert, an unique alert identifier, and a network address of a Web site for managing the alert subscription. Alert e-mail messages generated by the subscription source 34 may also identify a server type for the subscription source. TABLE 1 illustrates the x-header fields included in an alert e-mail message generated by the subscription source 34. As known to those skilled in the art, these header fields are not generally displayed by e-mail client applications but may be extracted from an e-mail message and stored in the alert sources list 32 by the e-mail client application 24. An illustrative method for identifying an e-mail relating to an alert subscription will be described below with reference to FIG. 10.

TABLE 1

From: <Alert Web Title>
X-AlertServerType
X-AlertId
X-AlertTitle
X-AlertWebUrl
X-AlertWebSoap As discussed briefly above, the Web server application 30 is operative to receive and respond to requests for portions of the Web site 36, such as the Web page 37. When the requested Web page 37 relates to an alert subscription, the Web server application 30 may also request that the Web browser application 26 store a cookie, or other type of persistent state object, in the cookie store 27. In particular, the cookie may contain information identifying the subscription source 34 as the source of an alert subscription. As with the encoded alert e-mail messages described above, the cookie may include data identifying the server type, the title and network address for a Web page for modifying or deleting the alert subscription, and a network address for communicating with the alert interface code 38. TABLE 2 illustrates the contents of such a cookie utilized in one embodiment of the invention.

TABLE 2

AlertWebTitle
AlertServerType
AlertWebUrl
AlertWebSoap

According to one embodiment of the invention, the e-mail client application 24 is operative to periodically execute code for searching the cookie store 27 for cookies containing data relating to an alert subscription. This code may be executed when a cookie is received or may be executed periodically, such as each time the e-mail client application 24 is accessed. This code searches the contents of each cookie contained in the cookie store 27 to determine if the cookie contains the data shown above in TABLE 2. Alternatively, a subset of the cookies contained in the cookie store 27 may be searched. The name of the cookie may be utilized to identify the appropriate subset of cookies to search. In this manner, each cookie contained in the cookie store 27 need not be searched. If a cookie contains this data, the e-mail client application 24 is operative to add the data to the alert sources list 32. An illustrative method for identifying alert subscriptions from the contents of a cookie will be described below with respect to FIG. 11.

Figure 3:
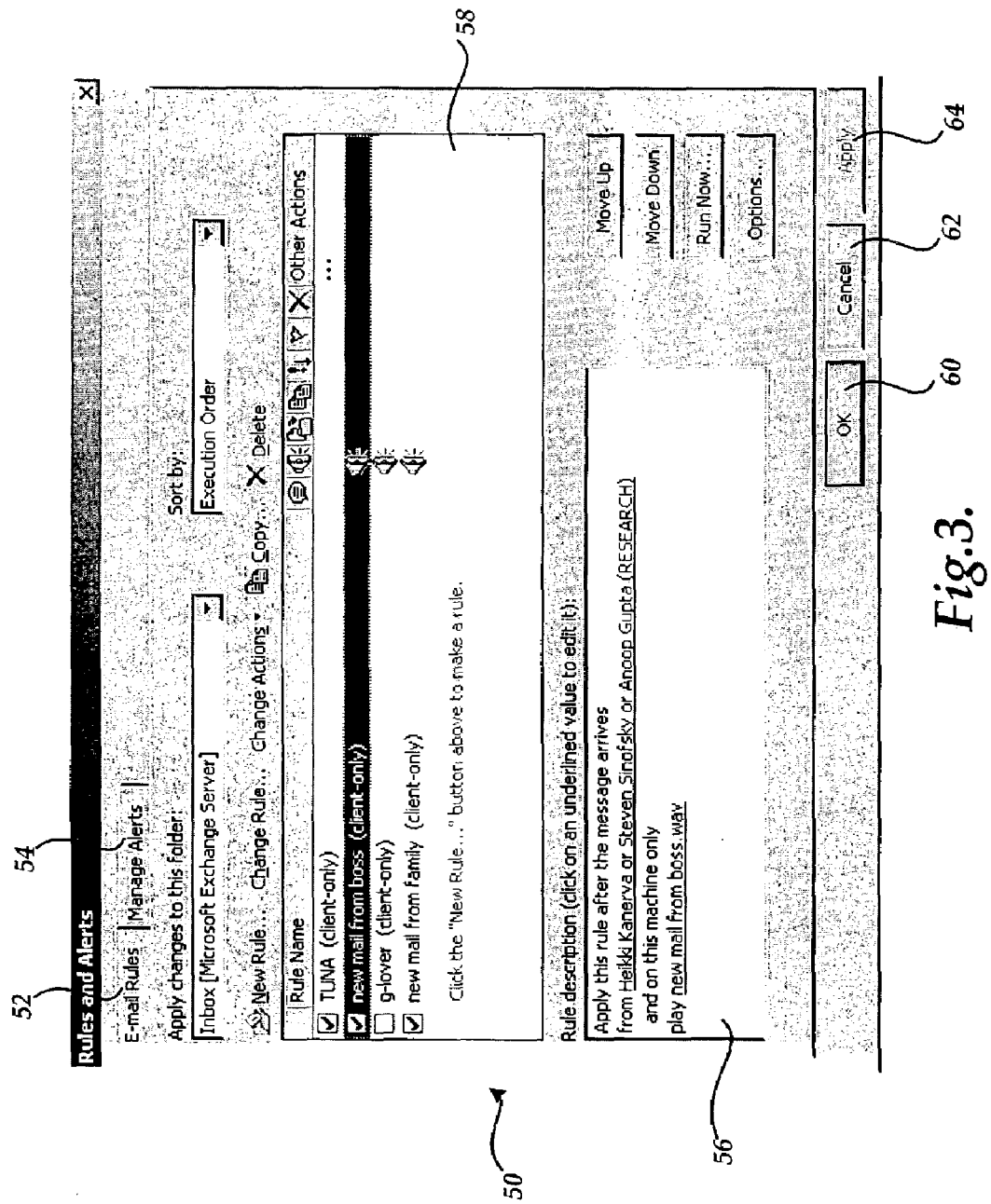

Turning now to FIG. 3, an illustrative user interface for managing e-mail rules and alert subscriptions will be described. As shown in FIG. 3, the e-mail client application 24 may provide a unified user interface window 50 for managing both e-mail rules and alert subscriptions. In particular, according to one embodiment, the user interface window includes a displayed portion for managing e-mail rules. As known to those skilled in the art, e-mail rules comprise defined actions that are applied to e-mail messages when they are received. For instance, e-mail rules may be defined that delete, move, forward, or perform other actions on incoming messages matching certain user defined criteria.

Figure 9:
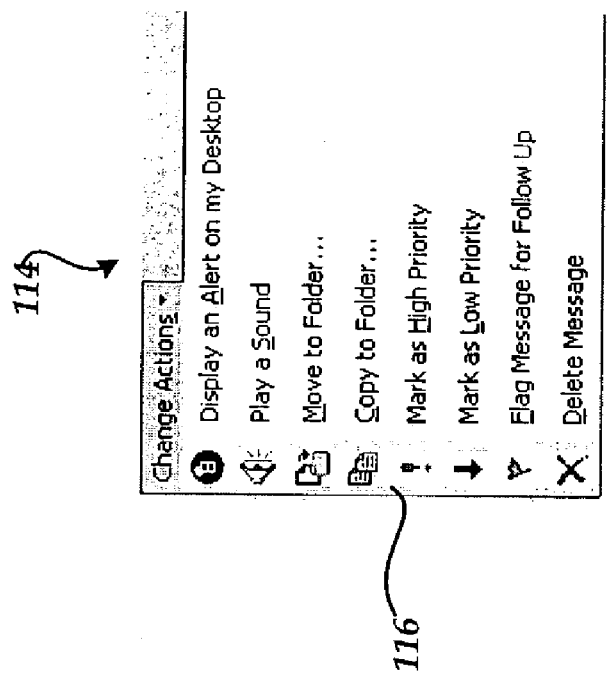
FIGS. 8-9 show aspects of a unified user interface for managing e-mail rules and alert subscriptions provided in one embodiment of the invention.

The displayed portion of the user interface window 50 for managing e-mail rules is selected through the "e-mail rules" tab 52. Once the tab 52 has been selected, the list of e-mail rules 58 is displayed. The list of e-mail rules 58 lists all currently active e-mail rules in the order that they are applied. User interface buttons may be provided to change the order of the e-mail rules in the list of e-mail rules 58. Additionally, a user interface window pane 56 displays the contents of the e-mail rule for a selected rule in the list of e-mail rules 58. Other user interface objects are also provided for creating a new rule, changing a rule, deleting a rule, or changing the actions that are associated with a particular rule. FIG. 9 illustrates a drop-down menu 114 showing a list of actions 116 that may be performed on an e-mail message. The list of actions 116 includes actions for displaying an alert on the user interface desktop (such as through an IM application), playing a sound, moving or copying the e-mail message, assigning priorities to the e-mail message, flagging the message for follow up, and deleting the message. A user may select the "apply" button 64 to apply any changes. A user may also select the "OK" button 60 or the cancel button 62 when the user has completed their use of the user interface window 50.

In order to access the portion of the user interface window 50 for managing alert subscriptions, a user may select the "manage alerts" tab 54. When the tab 54 is selected, the user is presented with the user interface window 50 shown in FIG. 4. The user interface window 50 shown in FIG. 4 includes user interface elements for managing alert subscriptions such as an alert subscription with the subscription source 34. When the tab 50 is selected, the e-mail client application 24 builds and displays the current subscriptions list 78. The current subscriptions list 78 identifies all alert subscriptions currently held by the current user of the subscriptions client 42.

Each subscription in the current subscriptions list 78 is verified prior to displaying the subscription to the user. As shown in FIGS. 5A-5C, the status of the verification process may be displayed to the user. For instance, as shown in FIG. 5A, the alert description field 82 indicates that alert information is being retrieved for the subscription source identified as "Bitpipe, Inc." in the alert source field 80. In FIG. 5B, the alert description field 82 indicates that a connection could not be made with the alert source for "Bitpipe, Inc." As shown in FIG. 5C, the alert description field 82 includes a description of the alert if the subscription can be verified. An illustrative method for generating and displaying the current subscriptions list will be described below with respect to FIG. 12. As will be described in greater detail below, according to one embodiment of the invention, only those subscriptions sources that can be verified are presented to the user.

In order to create a new alert subscription, a user may select the "new alert" button 70. In response to the selection of the "new alert" button 70, the e-mail client application 24 displays the dialog box 90 displayed in either FIG. 6A or FIG. 6B. As shown in FIG. 6A, the dialog box 90 may include a tree display 92 identifying all of the previously validated subscription providers currently sending alerts. The tree display 92 may also identify alert subscription providers that have been previously visited using the Web browser application 26. These providers may be identified based on the contents of cookies contained in the cookie store 27. The tree display 92 may also include the identities of Web sites providing notification services that the user has accessed or stored documents on. These systems may be identified based upon the server name associated with these servers.

As shown in FIG. 6B, the tree display 92 may also identify sites identified in a network places area of the subscription client 42. The user may select one of the subscription sources identified in the tree display 92 or manually provide a network address for the subscription provider in the field 94. Once the user has made a selection, the user may then select the "open" button 60 to create a new alert or the "cancel" button 62 to cancel the selection. If the user selects the "open" button 60, a window is opened in the Web browser application 26 that is directed to the Web site for managing subscriptions provided by the subscription source. FIG. 7 illustrates such a Web site. The Web site includes a list of alert subscriptions 102 that may be made by the user. Additional pages may be displayed for customizing the alert by the selection of the "next" button 104. A method for adding a new alert subscription will be described below with respect to FIG. 13.

Figure 4:
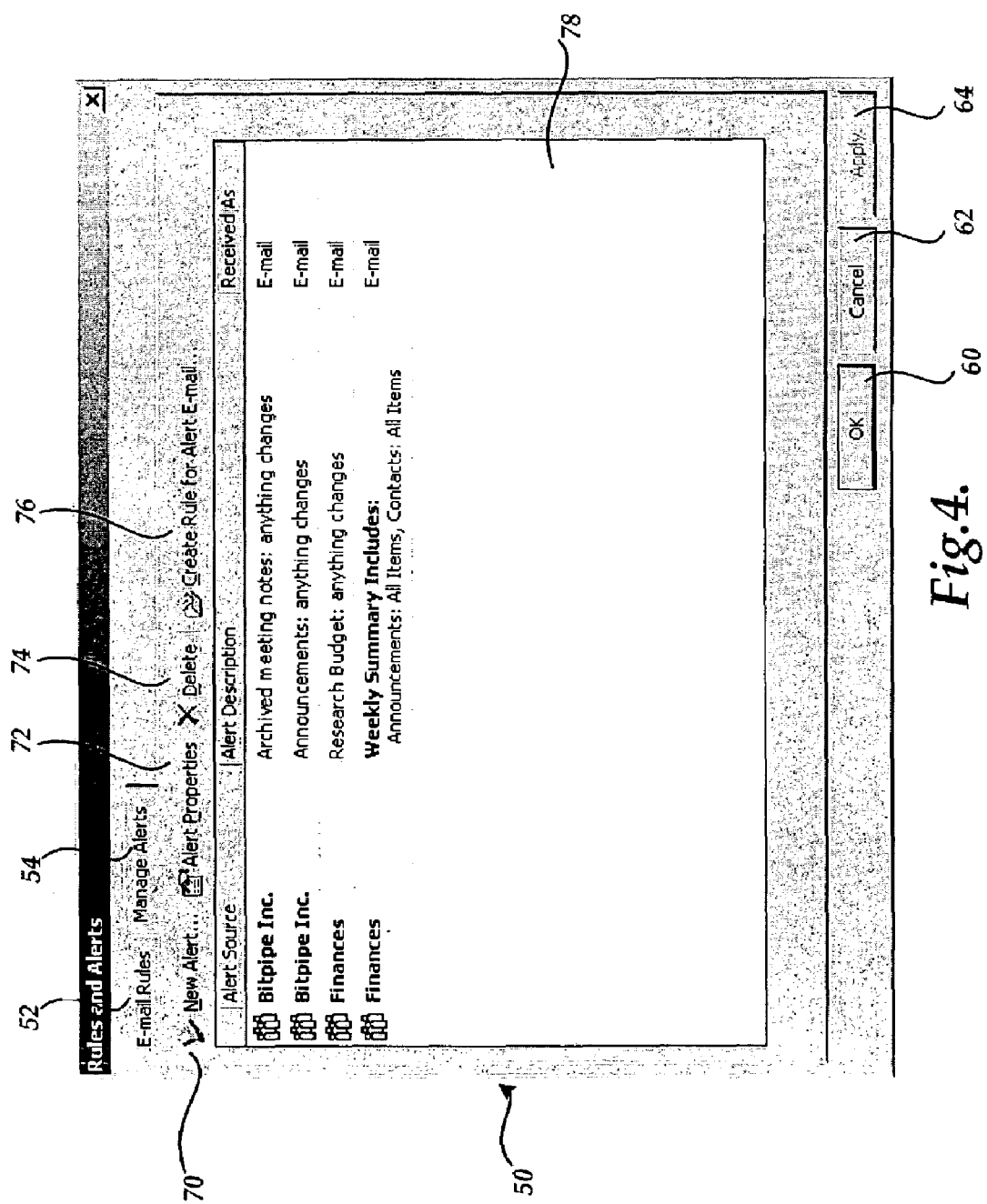
Figure 8:
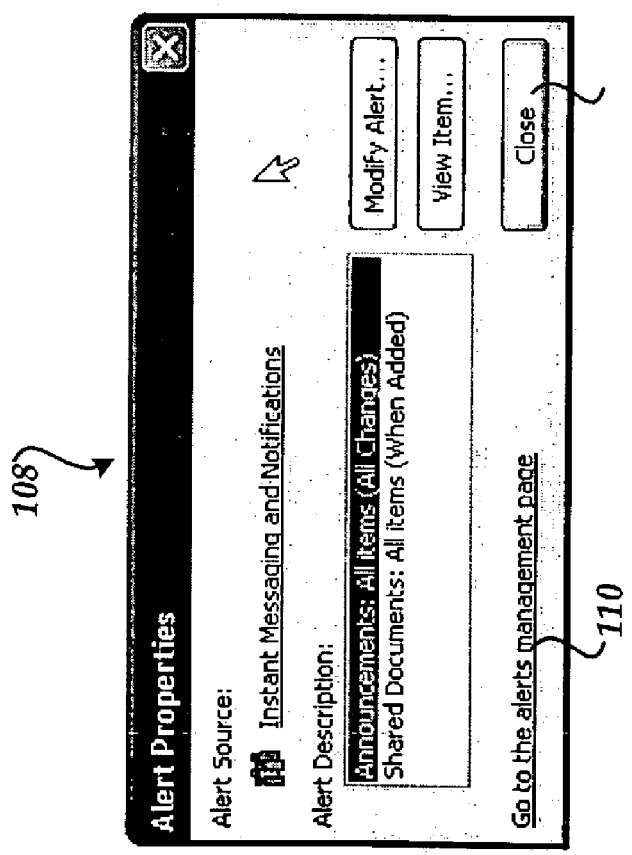

Still referring to FIG. 4, a user may select the "alert properties" button 72 to display properties for the alert subscription selected in the current subscriptions list 78. In response to the selection of the "alert properties" button 72, the e-mail client application 24 is operative to display the dialog box 108 shown in FIG. 8. The dialog box shows the identity of the alert source and provides a link to the Web site maintained by the alert source. The dialog box 108 also provides a description of the alert and identifies the item to which the alert applies. From the dialog box 108, a user may manage alerts, including the creation of a new e-mail rule that applies to incoming messages generated as a result of the alert subscription, by selecting the "alerts management" hyperlink 110. Once the user has completed viewing the properties for the selected alert, the user may select the "close" button 112 to close the dialog box 108.

It should be appreciated that an e-mail rule that applies to incoming messages generated as a result of the alert subscription may be created by selecting the "create rule" button 76 shown in FIG. 4. A user may also delete a selected rule by selecting the "delete" button 74. A user may also select the tab 52 to return to the portion of the window 50 for managing e-mail rules or select the "OK" button 60, the "cancel" button 62, or the "apply" button 64 to perform the respective function.

The logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto.

Figure 10:
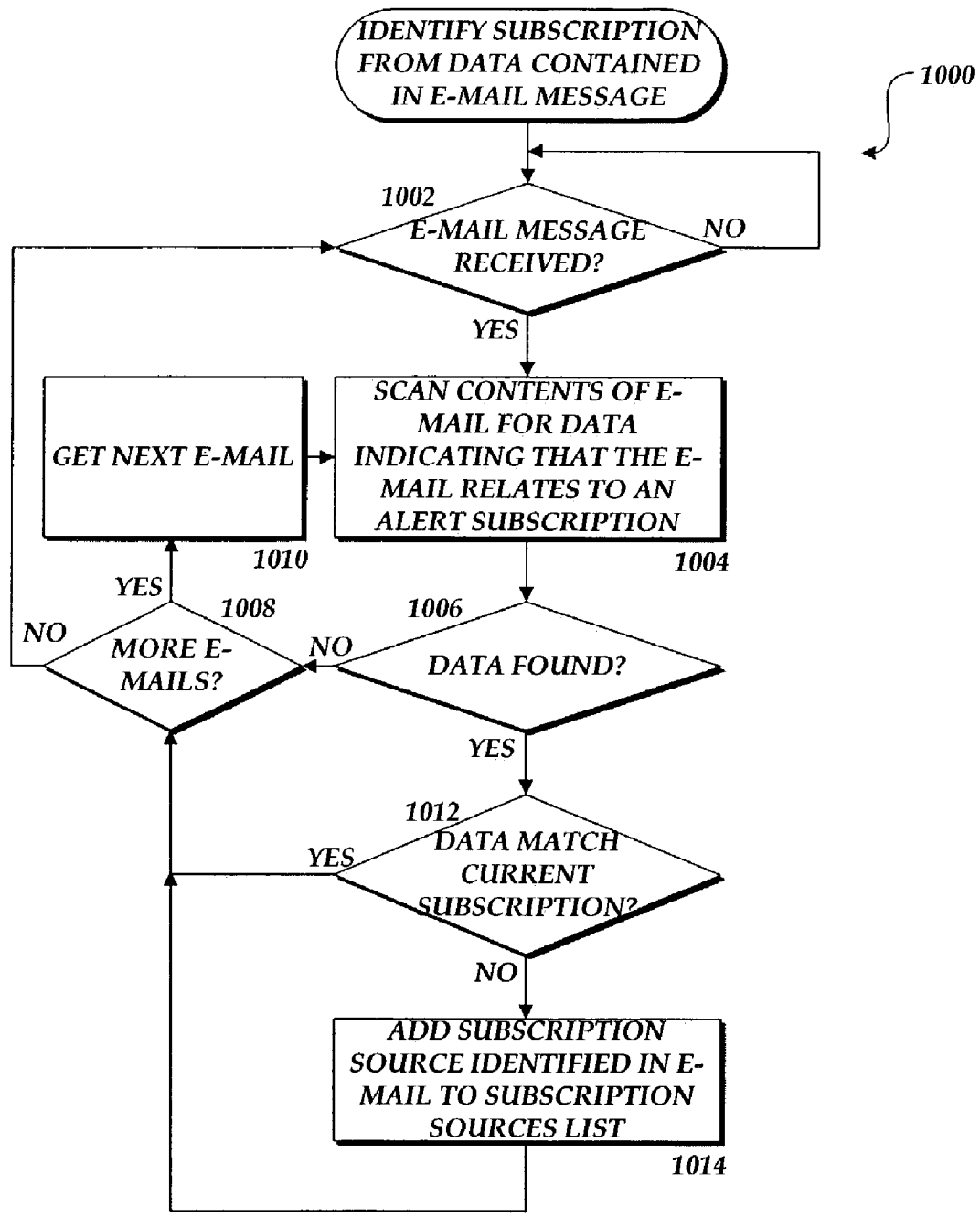
FIG. 10 shows an operational flow for identifying an e-mail message related to an alert subscription according to one embodiment of the invention.

Referring now to FIG. 10, an illustrative routine 1000 will be described illustrating the operations for identifying an alert subscription from the contents of an e-mail message. As discussed above, the e-mail client application 24 is operative to examine received e-mail messages to determine whether the messages relate to an alert subscription. Accordingly, the routine 1000 begins at decision operation 1002, where a determination is made as to whether an e-mail message has been received. If an e-mail message has not been received, the routine 1000 branches back to decision operation 1002. If an e-mail message has been received, the routine 1000 continues to search operation 1004, where the contents of the received e-mail messages are searched to determine if the e-mail message relates to an alert subscription. As discussed above, this may comprise searching the header portion of the e-mail for the information identified in TABLE 1, above.

From search operation 1004, the routine 1000 continues to decision operation 1006 where a determination is made as to whether information was located in the e-mail message indicating that the message relates to an alert subscription. If no such data was located, the routine 1000 branches to decision operation 1008 where a determination is made as to whether additional e-mail messages have been received. If additional e-mail messages have been received, the routine 1000 branches to the retrieval operation 1010 where the next e-mail message is retrieved and processed. If no additional e-mail messages have been received, the routine 1000 branches from decision operation 1008 to decision operation 1002, where additional e-mail messages may be processed in the manner described above.

If, at decision operation 1006, it is determined that data was found in the received e-mail message indicating that the message relates to an alert subscription, the routine 1000 continues from decision operation 1006 to decision operation 1012. At decision operation 1012, a determination is made as to whether the information contained in the received e-mail regarding the subscription matches a current subscription previously identified by the subscription client 42. This may be accomplished by comparing the information extracted from the received e-mail message to the alert sources list 32. If a match is found, there is no need to add the alert source identified in the received e-mail to the alert sources list 32. Therefore, the routine 1000 branches from the decision operation 1012 to the decision operation 1008 if a match is found. If no match is found, the routine 1000 branches from the decision operation 1012 to the process operation 1014, where the information contained in the e-mail message relating to the subscription is added to the alert sources list 32. In particular, the information identified above in TABLE 1 is added as a new entry in the alert sources list 32. The routine 1000 then continues from process operation 1014 to decision operation 1008.

Figure 11:
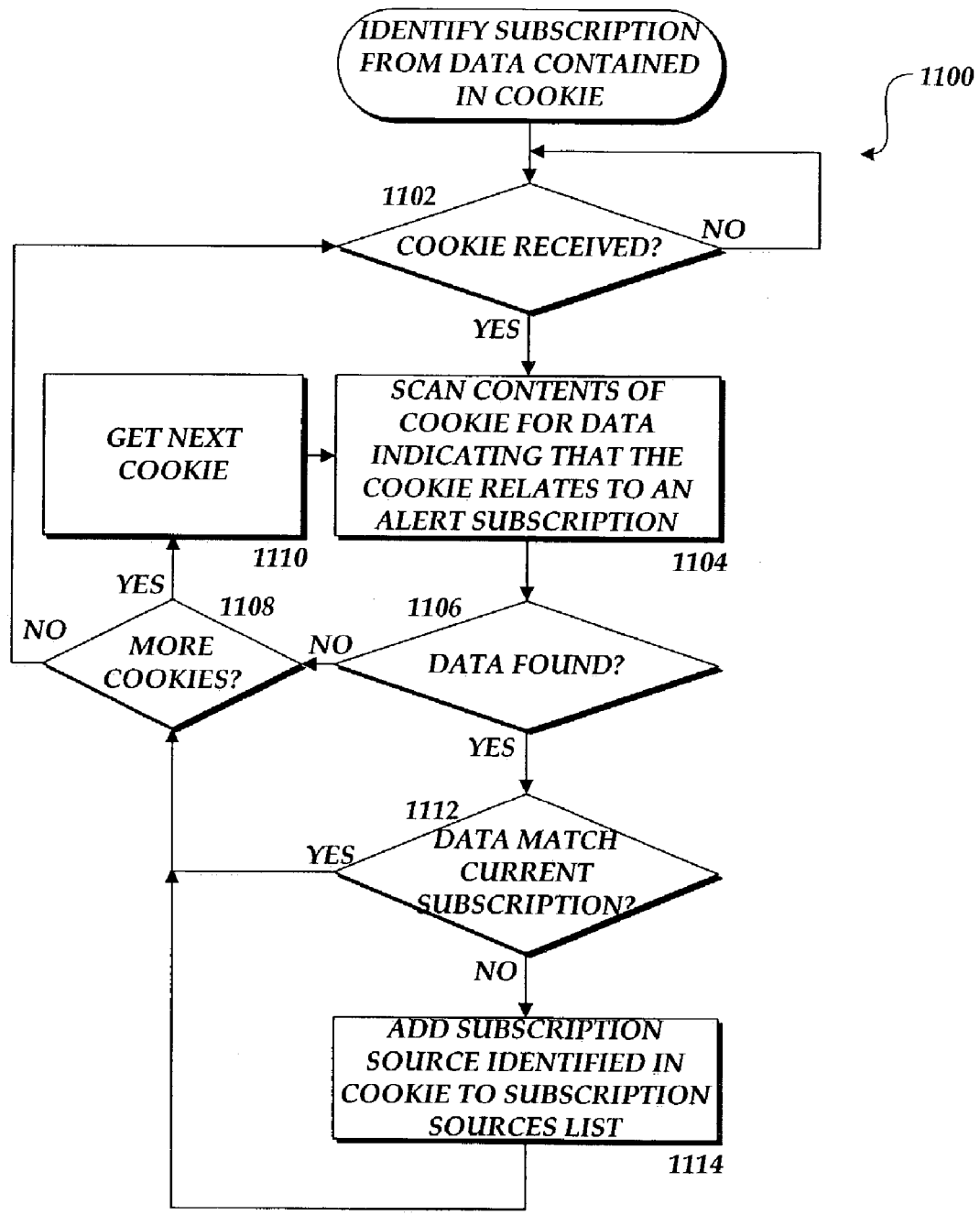
FIG. 11 illustrates an operational flow for identifying a persistent state object, such as a Web browser cookie, related to an alert subscription according to one embodiment of the invention.

Referring now to FIG. 11, an illustrative routine 1100 will be described illustrating the operations for identifying an alert subscription from the contents of a cookie or other type of persistent state object. As discussed above, the e-mail client application 24 is operative to periodically examine received cookies to determine whether the cookie relates to an alert subscription. Accordingly, the routine 1100 begins at decision operation 1102, where a determination is made as to whether a cookie has been received. If a cookie has not been received, the routine 1100 branches back to decision operation 1102. If cookie has been received, the routine 1100 continues to search operation 1102, where the contents of the cookie store 27 are searched to determine if any cookies contained therein relate to an alert subscription. As discussed above, this may comprise searching each cookie for the information identified in TABLE 2, above. It should be appreciated that, according to various embodiments of the invention, the receipt of a cookie is not necessary to trigger the process illustrated in FIG. 11. Instead, the process illustrated in FIG. 11 may be performed on a periodic basis by the e-mail client application 24 rather than in response to the receipt of a cookie.

From search operation 1104, the routine 1100 continues to decision operation 1006 where a determination is made as to whether information was located in the received cookie indicating that the cookie relates to an alert subscription. If no such data was located, the routine 1100 branches to decision operation 1108 where a determination is made as to whether additional cookies remain to be checked. If additional cookies remain to be checked, the routine 1100 branches to the retrieval operation 1110 where the next cookie is retrieved from the cookie store 27 and processed. If no additional cookies have been received, the routine 1100 branches from decision operation 1108 to decision operation 1102, where additional e-mail messages may be processed in the manner described above.

If, at decision operation 1106, it is determined that data was found in the received cookie indicating that the cookie relates to an alert subscription, the routine 1100 continues from decision operation 1106 to decision operation 1112. At decision operation 1112, a determination is made as to whether the information contained in the cookie regarding the subscription matches a current subscription previously identified by the subscription client 42. This may be accomplished by comparing the information extracted from the cookie to the alert sources list 32. If a match is found, there is no need to add the alert source identified in the cookie to the alert sources list 32. Therefore, the routine 1100 branches from the decision operation 1112 to the decision operation 1108 if a match is found. If no match is found, the routine 1100 branches from the decision operation 1112 to the process operation 1014, where the information contained in the cookie relating to the subscription is added to the alert sources list 32. In particular, the information identified above in TABLE 2 is added as a new entry in the alert sources list 32. The routine 1100 then continues from process operation 1114 to decision operation 1108.

Figure 12:
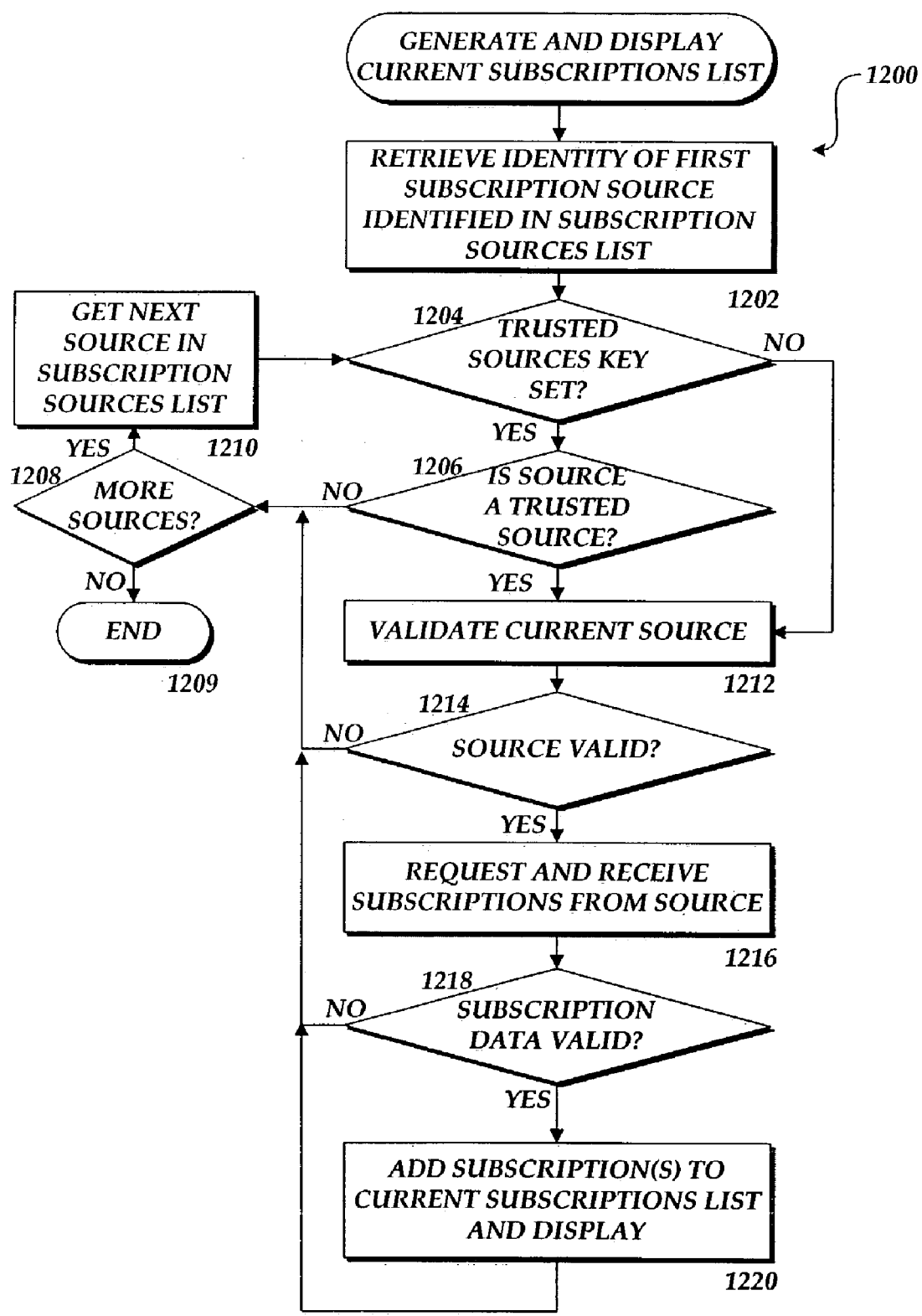
FIG. 12 shows an operational flow for generating a current subscriptions list utilized in a unified user interface for managing e-mail rules and alert subscriptions provided in one embodiment of the invention.

Turning now to FIG. 12, an illustrative routine 1200 will be described for generating and displaying a current subscriptions list. As discussed above with respect to FIG. 4, the current subscriptions list 78 is displayed in the portion of the unified user interface for managing e-mail rules and alert subscriptions. As also discussed above, a subscription source is only displayed in the current subscriptions list 78 if the source can be validated. Accordingly, the routine 1200 begins at retrieval operation 1202 where the identity and network address of a first subscription source is retrieved from the alert sources list 32. The routine 1200 then continues to decision operation 1204, where a determination is made as to whether a trusted sources key is set. A trusted sources key allows a user to specify that only trusted subscription sites be validated. A list may be maintained of all of the trusted sites or domains.

If the trusted sources key is not set, the routine 1200 branches to validation operation 1212. If the trusted sources key is set, the routine 1200 continues to decision operation 1206, where a determination is made as to whether the current source is trusted. If the current subscription source is not trusted, the routine 1200 branches to decision operation 1208, where a determination is made as to whether additional sources remain in the alert sources list 32 to be verified. If additional sources remain to be verified, the routine 1200 branches to retrieval operation 1210, where the next subscription source identified in the alert sources list 32 is retrieved. If no additional sources remain to be verified, the routine 1200 branches to stop operation 1209, where it ends.

If, at decision operation 1206, it is determined that the current subscription source is a trusted source, then the routine 1200 branches from decision operation 1206 to validation operation 1212. At validation operation 1212, a SOAP request is transmitted from the e-mail client application 24 to the alert interface code 38 executing on the identified subscription source 34. A response is then generated at the subscription source 34 and transmitted to the e-mail client application 24. If the response is correct, the subscription source is valid. If the response is incorrect, the subscription source is not valid. Accordingly, the routine 1200 continues from validation operation 1212 to decision operation 1214, where a determination is made as to whether the subscription source is valid. If the subscription source is not valid, the routine 1200 branches to determination operation 1208. If the subscription source is valid, the routine 1200 continues to process operation 1216.

At process operation 1216, the e-mail client application 24 transmits a SOAP request to the alert interface code 38 executing on the current subscription source for all subscriptions for the user. In response, the alert interface code 38 will generate an XML data structure identifying all of the subscriptions held by the user and transmit the XML data structure to the e-mail client application 24. An example of such a data structure is shown below in TABLE 3. As shown in TABLE 3, the XML data structure includes an XML tag called <GetAlertsResponse> that indicates that the XML data structure is a response to a request to identify one or more alert subscriptions. Within the <GetAlertsResponse> tag is a <GetAlertsResult> tag that identifies the user and the name of the server computer providing the alert subscriptions and other information. The <GetAlertsResponse> tag may also identify a network address for the server computer, a server type for the server computer, a Web address for a Web site hosted by the server computer for managing the alert subscriptions, and a network address for a Web site for adding new alerts. Within the <GetAlertsResult> tag are one or more additional <Alert> tags that identify each alert to which the user has subscribed and provide additional information such as the Web address corresponding to the alert. An <Alert> tag is provided for each alert to which the user subscribes.

TABLE 3

```
<?xml version="1.0" encoding="utf-8"?>
<soap:Envelope
xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
    <soap:Body>
        <GetAlertsResponse
xmlns="http://schemas.microsoft.com/sharepoint/soap/2002/1/alerts/">
            <GetAlertsResult>
                <CurrentUser>string</CurrentUser>
                <AlertServerName>string</AlertServerName>
                <AlertWebUrl>string</AlertWebUrl>
                <AlertServerType>string</AlertServerType>
<AlertsManagementUrl>string</AlertsManagementUrl>
                <AlertWebTitle>string</AlertWebTitle>
                <NewAlertUrl>string</NewAlertUrl>
                <AlertWebId>string</AlertWebId>
                <Alerts>
                    <Alert>
                        <Id>string</Id>
                        <Title>string</Title>
                        <Active>boolean</Active>
                        <EventType>string</EventType>
                        <AlertForTitle>string</
AlertForTitle>
                        <AlertForUrl>string</AlertForUrl>
                        <EditAlertURL>string</EditAlertURL>
                        <DeliveryChannels xsi:nil="true" />
                    </Alert>
                </Alerts>
            </GetAlertsResult>
        </GetAlertsResponse>
    </soap:Body>
</soap:Envelope>
```

From process operation 1216, the routine 1200 continues to decision operation 1218. At decision operation 1218, a determination is made as to whether the XML subscription data received from the subscription source 34 is valid. If the data is not valid, the routine 1200 branches to decision operation 1208. If the data is valid, the routine 1200 continues to process operation 1220, where the alert subscriptions identified in the XML subscription data are added to the current subscriptions list 58 and displayed. The routine 1200 then continues from process operation 1220 to decision operation 1208, where the process is repeated for each subscription source identified in the alert sources list 32.

It should be appreciated that, according to one embodiment of the invention, the number of unvalidated subscription sources in the alert sources list may be limited. By limiting the number of unvalidated subscription sources, the number of unsolicited alert subscriptions, for instance sent by a malicious operator of a subscription source, may be limited.

Figure 13:
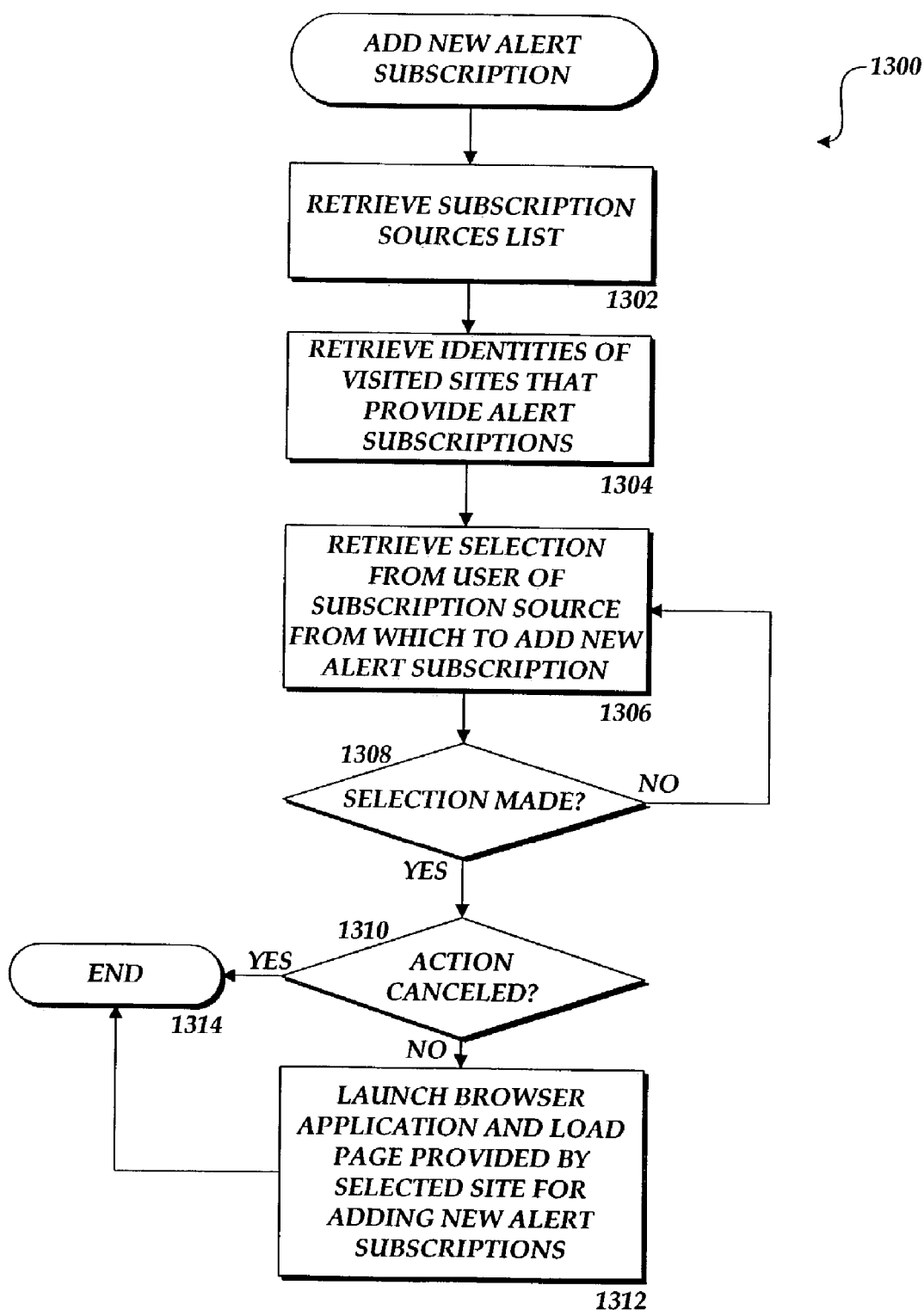
FIG. 13 illustrates an operational flow for adding a new alert subscription provided in one embodiment of the invention.

Turning now to FIG. 13, an illustrative routine 1300 will be described for adding a new alert subscription. As discussed above with respect to FIGS. 4 and 6A-6B, a user may create a new alert subscription by selecting the "new alert" button 70 within the user interface window 70. In response to selecting the "new alert" button 70, the user is presented with the dialog box 90 shown in FIGS. 6A-6B. The user can then select the subscription source at which a new subscription should be made. The routine 1300 illustrates the operations necessary for providing this functionality.

The routine 1300 begins at process operation 1302, where the alert sources list 32 is retrieved. As shown in FIG. 6A, the alert sources 32 identified in the alert sources list 32 that are currently providing alerts to the user may be displayed for user selection. From process operation 1302, the routine 1300 continues to process operation 1304, where the identities of sites that provide subscription sources are identified. As discussed above, a Web site may have a cookie stored in the cookie store 27 when a user visits the site. The cookie may contain the data identified above in TABLE 2 that indicates that the site provides alerts. Accordingly, at process operation 1304, the cookie store 27 may be searched to identify Web sites visited using the Web browser application 26 that provide alerts. As shown in FIG. 6A, these sites may then also be displayed for user selection. From process operation 1304, the routine 1300 continues to process operation 1306, where a selection is received from a user of a subscription source to which a new subscription should be made. This may include the selection by the user of a source from the tree display 92 or the manual provision of a network address by the user.

From process operation 1306, the routine 1300 continues to decision operation 1308, where a determination is made as to whether the user has made a selection. If the user has not made a selection, the routine 1300 returns to process operation 1306. If the user has made a selection, the routine 1300 continues to decision operation 1310. At decision operation 1310, a determination is made as to whether the user selected the "cancel" button 62 shown in FIGS. 6A-6B. If the user selected the "cancel" button, the routine 1300 branches to stop operation 1314, where it ends. If the user has not selected the "cancel" button, the routine 1300 continues to process operation 1312, where the Web browser application 26 is launched and directed to the Web site provided by the subscription source for adding new alerts. An example of such a Web site is shown in and discussed above with reference to FIG. 7. From process operation 1312, the routine 1300 continues to stop operation 1314, where it ends.

Based on the foregoing, it should be appreciated that the various embodiments of the invention provide a method, system, apparatus, computer-readable medium and user interface for managing e-mail rules and alert subscriptions. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for managing electronic mail and alert messages, the method comprising:
receiving communication wherein contents of the communication comprises a header, and wherein the header comprises data configured to identify a network address for accessing an alert interface code on a subscription source, the alert interface code configured to use an XML schema for passing parameters to the alert interface code and for receiving results of queries made to the alert interface code, the alert interface code configured to expose an interface for at least one of the following: determining an alert subscription, deleting the alert subscription, and adding a new alert subscription;
wherein the communication comprises an electronic mail message and a persistent state object;

determining, based on the contents of the communication, whether the communication is related to the alert subscription;

in response to determining that the communication is related to the alert subscription, adding the subscription source identified by the contents of the communication to a list of subscription sources;

wherein the communication comprises data identifying the network address at which communication may be made with the subscription source;

determining, based on the content of the communication, whether the communication identifies a new alert subscription source;

in response to determining based on the contents of the communication, that the communication identifies a new alert subscription source, adding the new alert subscription source to the list of subscription sources;

maintaining a list of active trusted subscription sources;

determining whether each subscription source in the list of subscription sources is associated with at least one of the list of trusted subscription sources;

determining whether each subscription source in the list of subscription sources that is associated with at least one of the listed trusted subscription sources is valid wherein each subscription source comprises a computer responds to requests associated with the alert interface code;

in response to receiving a request to manage at least one subscription source, displaying the list of subscription sources that are associated with at least one of the listed trusted subscription sources and whether each subscription source in the list of subscription sources is valid;

receiving a request to manage one or more alert subscriptions;

in response to said request, determining whether each subscription source identified in the list of subscription source may be validated;

retrieving from each validated subscription source the identify of one or more subscriptions;

adding each subscription to a current subscriptions list and displaying the current subscription list;

receiving a request to add a new alert subscription;

in response to the request, receiving the identify of a subscription source providing the new alert subscription, the subscription source for the new alert subscription comprising a validated subscription source, or a previously visited alert provider, or a manually provided network address for the subscription source; and displaying information for defining the new alert subscription provided by the subscription source providing the new alert subscription, wherein the displaying information includes: the validated subscription sources that are currently active, the subscription sources that is previously visited using a web browser application, and the subscription sources that a user has accessed or stored documentation on.

2. A computer-readable medium having stored thereon computer-executable instructions which, when executed by the computer, cause the computer to perform the method of claim 1.

3. A computer-controlled apparatus comprising a processor performs the method of claim 1.

4. A method for managing alert subscriptions, the method comprising:

receiving a communication wherein contents of the communication comprises a header, and wherein the header comprises data identify a network address configured to identify a network address for accessing an alert interface code on a subscription source, the alert interface code configured to use an XML schema for passing parameters to the alert interface code and for receiving results of queries made to the alert interface code, the alert interface code configured to expose an interface for at least one of the following: determining an alert subscription, deleting alert subscription, adding new alert subscriptions and performing other functions related to the management of alert subscriptions;

wherein the communication comprises an electronic mail message and a persistent state object;

determining, based on the contents of the communication, whether the communication is related to the alert subscription;

wherein the communication comprises data identifying the network address at which communication may be made with the subscription source;

in response to determining that the communication is related to the alert subscription, adding the subscription source identified by the contents of the communication to a list of subscription sources;

determining, based on the content of the communication, whether the communication identifies a new alert subscription source;

in response to determining, based on the contents of the communication, that the communication identifies a new alert subscription source, adding the new alert subscription source to the list of subscription sources;

maintaining a list of active trusted subscription sources;

determining whether each subscription source in the list of subscription sources is associated with at least one of the trusted subscription sources;

determining whether each subscription source in the list of subscription sources that is associated with at least one of the listed trusted subscription sources is valid wherein each subscription source comprises a computer responds to requests associated with the alert interface code;

in response to receiving a request to manage at least one subscription source, displaying the list of subscription sources that is associated with at least one of the listed trusted subscription sources and whether each subscription source in the list of subscription sources is valid;

receiving a request to manage one or more alert subscriptions;

in response to said request, determining whether each subscription source identified in the list of subscription source may be validated;

retrieving from each validated subscription source the identify of one or more subscriptions;

adding each subscription to a current subscriptions list and displaying the current subscription list, receiving a request to add a new alert subscription;

in response to the request, receiving the identify of a subscription source providing the new alert subscription, the subscription source for the new alert subscription comprising a validated subscription source, or a previously visited alert provider, or a manually provided network address for the subscription source; and displaying information for defining the new alert subscription provided by the subscription source providing the new alert subscription, wherein the displaying information includes: the validated subscription sources that are currently active, the subscription sources that is previously visited using a web browser application, and the subscription sources that a user has accessed or stored documentation on.

5. A computer-readable medium having stored thereon computer-executable instructions which, when executed by the computer, cause the computer to perform the method of claim 4.

6. A system for managing alert subscriptions, the system comprising:

a memory storage; and a processing unit coupled to the memory storage, wherein the processing unit receive a communication wherein contents of the communication comprises a header, and wherein the header comprises data identify a network address configured to identify a network address for accessing an alert interface code on a subscription source, the alert interface code configured to use an XML schema for passing parameters to the alert interface code and for receiving results of queries made to the alert interface code, the alert interface code configured to expose an interface for at least one of the following: determining an alert subscription, deleting alert subscription, adding new alert subscriptions and performing other functions related to the management of alert subscriptions, wherein the communication comprises an electronic mail message and a persistent state object, determine, based on the contents of the communication, whether the communication is related to the alert subscription, wherein the communication comprises data identifying the network address at which communication may be made with the subscription source;

in response to determining that the communication is related to the alert subscription, add the subscription source identified by the contents of the communication to a list of subscription sources;

determine, based on the content of the communication, whether the communication identifies a new alert subscription source;

in response to determining, based on the contents of the communication, that the communication identifies a new alert subscription source, add the new alert subscription source to the list of subscription sources;

maintain a list of active trusted subscription sources;

determine whether each subscription source in the list of subscription sources is associated with at least one of the list of trusted subscription sources;

determining whether each subscription source in the list of subscription sources that is associated with at least one of the listed trusted subscription sources is valid wherein each subscription source comprises a computer responds to requests associated with the alert interface code;

in response to receiving a request to manage at least one subscription source, displaying the list of subscription sources that are associated with at least one of the listed trusted subscription sources and whether each subscription source in the list of subscription sources is valid;

receiving a request to manage one or more alert subscriptions;

in response to said request, determining whether each subscription source identified in the list of subscription source may be validated;

retrieving from each validated subscription source the identify of one or more subscriptions;

adding each subscription to a current subscriptions list and displaying the current subscription list;

receiving a request to add a new alert subscription;

in response to the request, receiving the identify of a subscription source providing the new alert subscription, the subscription source for the new alert subscription comprising a validated subscription source, or a previously visited alert provider, or a manually provided network address for the subscription source; and displaying information for defining the new alert subscription provided by the subscription source providing the new alert subscription, wherein the displaying information includes: the validated subscription sources that are currently active, the subscription sources that is previously visited using a web browser application, and the subscription sources that a user has accessed or stored documentation on.

\* \* \* \* \*